C. C. FARMER.
AUTOMATIC TRAIN SPEED CONTROL DEVICE.
APPLICATION FILED MAY 12, 1920. RENEWED JAN. 14, 1921.

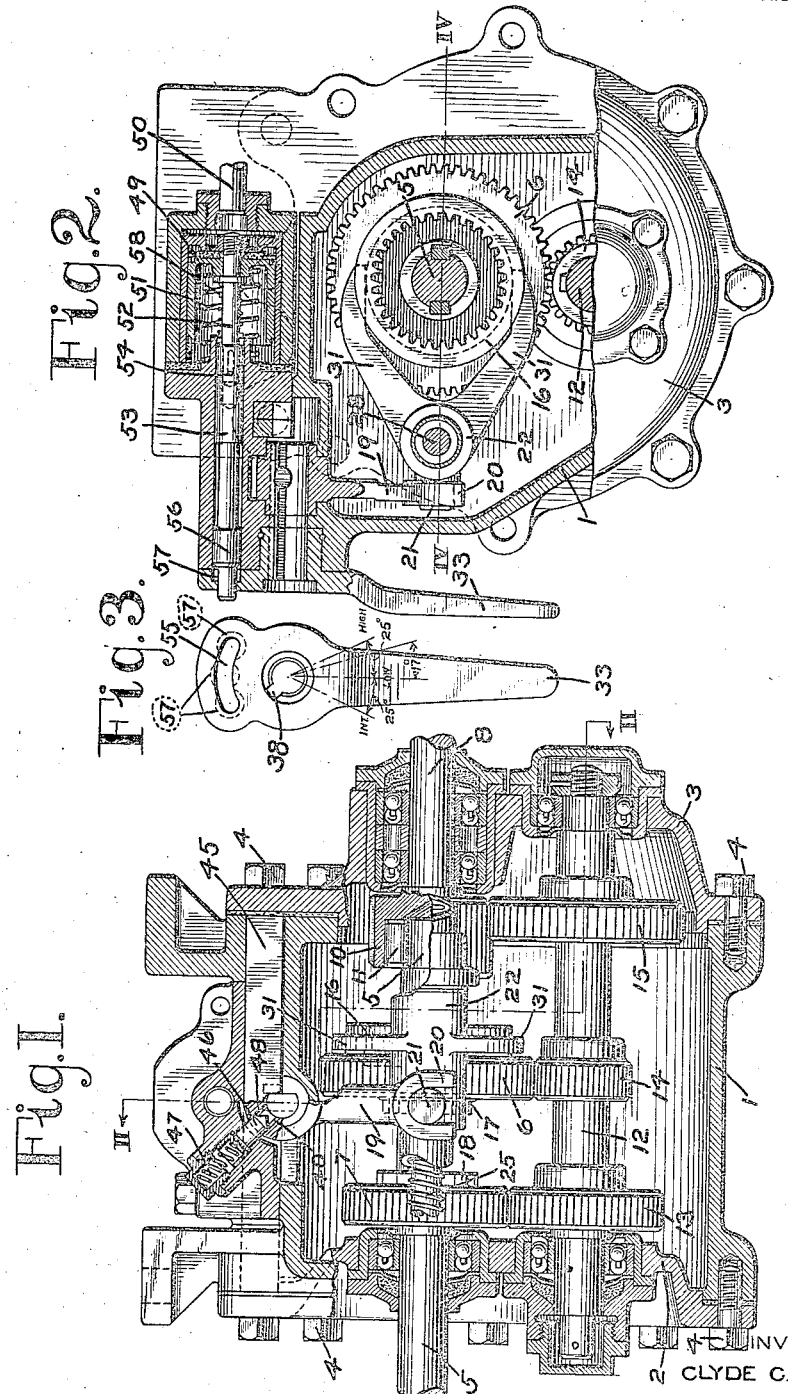

1,422,844.

Patented July 18, 1922.
2 SHEETS—SHEET 2.

INVENTOR
CLYDE C FARMER
BY
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC TRAIN-SPEED-CONTROL DEVICE.

1,422,844.     Specification of Letters Patent.     Patented July 18, 1922.

Application filed May 12, 1920, Serial No. 380,856. Renewed January 14, 1921. Serial No. 437,356.

*To all whom it may concern:*

Be it known that I, CLYDE C. FARMER, a citizen of the United States, residing at Edgewood, in the county of Allegheny and State of Pennsylvania, have invented new and useful Improvements in Automatic Train-Speed-Control Devices, of which the following is a specification.

This invention relates to an automatic speed control apparatus for controlling the speed of railway trains.

It has heretofore been proposed to provide a train speed control equipment in which the maximum speed at which the train may run is determined according to the traffic conditions, such as high speed, low speed, and an intermediate speed limit.

It will be evident that the same range of speeds would not be suitable for different classes of service, such as passenger service, freight service, and train yard service, and also that the speed control apparatus should be inoperative, where the equipment is operating on a road not equipped for automatic train control.

One object of my invention is to provide means whereby the range of train speeds may be varied to correspond with the class of service.

In order to prevent the engineer from changing the speed range at will, another object of my invention is to provide a change speed apparatus the range of speeds of which can only be changed at points where a signal operator or tower man is located and only when authorized by said operator.

Other objects and advantages will appear in the following more detailed description of the invention.

In the accompanying drawings; Fig. 1 is a central sectional view of a change speed gear mechanism for varying the speed ratio of the train speed controlling governor and embodying my invention; Fig. 2 a section on the line II—II of Fig. 1; Fig. 3 a face view of the operating handle; Fig. 4 a section on the line IV—IV of Fig. 2; Fig. 5 a detail sectional view of the locking device for locking the gear mechanism in the low speed position; Figs. 6, 7, and 8, side elevational views of the intermediate speed staff, the high speed staff, and the neutral staff respectively; Figs. 9, 10, and 11, end views of the respective staffs shown in Figs. 6, 7, and 8; and Fig. 12 a detail view, showing the application of an intermediate speed staff to the bars which determine the movement of the staff.

The change speed gear construction may comprise a main casing 1 having a cover plate 2 at one end and a cover plate 3 at the opposite end, secured to the casing by bolts 4.

Operatively connected to a driving axle of the locomotive and mounted in a ball bearing in the cover plate 2 is a shaft 5 and on said shaft is mounted a sliding gear 6 which is keyed to the shaft 5. Adjacent to the cover plate 2 a gear 7 is mounted to freely rotate on the shaft.

In axial alinement with the shaft 5 is a shaft 8 which is operatively connected to a speed governor device 9, and is mounted in a ball bearing in the cover plate 3. Secured to the inner end of the shaft 8 is a gear 10 having a roller bearing 11 therein, within which the end of the driving shaft 5 is mounted.

Adjacent to the shafts 5 and 8 is an idler shaft 12, the opposite ends of which are mounted in ball bearings in the cover plates 2 and 3 and on said shaft are secured gears 13, 14, and 15 adapted to mesh respectively with the gears 7, 6, and 10.

Carried by the gear 6 is an internal gear 16 adapted to mesh with the gear 10 upon sliding the gear 6 to the right so as to serve as a clutch for operatively connecting the driving shaft 5 to the governor shaft 8.

On the opposite face of the gear 6 there is provided a clutch member 17 adapted upon a sliding movement of the gear 6 to the left, to engage a corresponding clutch member 18 for operatively connecting the driving shaft 5 to the gear 7.

The sliding movement of the gear 6 is effected by a lever 19 having one end mounted to rotate in a suitable bearing and having a fork 20 at the opposite end adapted to engage a pin 21 on a member 22.

The member 22 comprises a cylindrical section having telescoping cylindrical casings 23 and 24 mounted within the opposite ends of the cylindrical section. Springs 25, 26, and 27 are mounted within the casings on a shaft 28 and are separated by sliding collars 29 and 30. Although a single spring would accomplish the desired purpose, the spring is made in three sections for convenience in assembling the parts.

The member 22 has an interlocking shoulder engagement with the casings 23 and 24, so that upon movement of the member 22 in one direction, one of the casings moves with the member 22 to compress the springs and upon movement of the member in the other direction, the other casing moves with said member to compress the springs. Thus the springs tend to yieldingly maintain said member in its central position.

The member 22 is provided with oppositely disposed fingers 31 adapted to engage in an annular groove 32 formed on the outside of the internal gear 16, so that movement of lever 19 operates to shift the gear 6 to the right or left.

The lever 19 is adapted to be rotated or rocked by means of a manually operated handle 33 and said handle is adapted to be operatively connected to the lever 19 by means of a removable staff.

Each staff is provided with a round section adapted to engage within alined openings in the handle 33 and the lever 19.

According to the construction shown in the drawings, provision is made for four operating conditions, namely; passenger service or a high speed range, freight service or a medium speed range, yard service or a low speed range, and service where the train speed control is inoperative or neutral.

For this purpose three different staffs are provided, an intermediate speed staff 34, a neutral staff 35, and a high speed staff 36, as shown in Figs. 6, 7, and 8 respectively.

Each staff has a key 37 for engaging a key way 38 in the handle 33 and a key 39 for engaging a key way 40 in the arm 19. Each key 39 has its outer end champered off as shown, and the key 39 of the staff 35 has the sides champered, so as to permit a certain amount of lost motion in the key way 40.

The staff 34 has at its inner end a flat section 41 having a notch 42 and the keys 35 and 36 have a flat section 43.

Bars 44 and 45 see Fig. 12 are arranged in the gear box 1 and are provided with respective notches 46 and 47 in position for receiving the flat section of the key, as shown in Fig. 12.

When the staff 34 is inserted in position, the flat section 41 engages the bar 44 at one side, while the notch 42 permits free rotative movement of the staff with respect to the bar 45, so that this key may only be rotated in a clockwise direction.

The flat section 43 of the staffs 35 and 36 does not extend through the rear bar 44 but engages the bar 45 at one side, so that these staffs can only be rotated in a counter clockwise direction.

When no staff is inserted in the gear box, the springs 25, 26, and 27 throw the parts to the low speed position and said parts are then locked in this position by a pin 46 which is subject to the pressure of a spring 47 and which, when the arm 19 is in its low speed position, engages in an aperture 48 in the arm 19, as more clearly shown in Fig. 5.

The handle 33 is adapted to be locked in its different operating positions by a device which is held in its locking position so long as there is pressure in the main reservoir, but when pressure is lost, the device releases the handle, so that the parts are shifted to the low speed position.

For this purpose, a piston 49 is provided, which is subject on one side to the pressure in the main reservoir as supplied thereto through a pipe 50 and on the opposite side to the pressure of a spring 51.

Attached to the piston 49 is a stem 52, the end of which works in a bore of a locking rod 53, the stem 52 being slotted for a pin 54 secured to the rod 53, so that the movement of the stem 52 by piston 49 will force the rod 53 into locking position.

The outer end of the rod 53 is of reduced diameter adapted to work in an arc-shaped slot 55 in the handle 33 and adjacent to the end is an enlarged section 56 which is adapted to engage corresponding recesses 57 in the handle according to the position of adjustment of said handle.

A light coil spring 58 mounted on the stem 52 is interposed between the rod 53 and the piston 49, so that the rod 53 is yieldingly held in its locked position, but may be released from the handle 33 by pressing in on the outer end of the rod, against the spring 58.

Means are provided, so that the engineer can only secure a staff for operating the change speed gear mechanism as authorized by a tower man or other operator at designated points, such means being the subject of a companion application, Serial No. 380,858, filed May 12, 1920.

In operation, without any staff inserted in position in the gear-box, the yielding member 22, through the fingers 31, maintains the gear 6 in mesh with the gear 14 and the parts are locked in this position by the pin 46 engaging in the aperture 48 of the arm 19.

With the above gears engaged, the relative speed of the governor 9 will be in accordance with the gear ratio provided by said gears and the gears 15 and 10, the transmission being from the gears 6 and 14 through shaft 12 and thence through the gears 15 and 10 to the speed governor shaft 8.

If the engineer obtains an intermediate staff 34 at a designated point he is enabled to adjust the gear mechanism for the intermediate speed range by inserting the staff in the proper opening through the handle 33.

As the staff is pushed in, the pin 46 is raised by the engagement of the champered end of the key 39 with the tapered end of the pin, so that the arm 19 is unlocked for rotative movement. The handle 33 is then rotated after first depressing the rod 53, so as to release the section 56 from the recess 57 in the handle 33.

As will be noted, however, from Fig. 12, the handle can only rotate the staff in a clockwise direction, by reason of the engagement of one side of the flat section 41 with the bar 44, so that the arm 19 is turned to the left, causing the clutch member 17 to engage the teeth of the clutch member 18 and causing the disengagement of the gears 6 and 14.

The gear 7 is thus operatively connected to the driving shaft 5 and the transmission is through the gear 13 and shaft 12 to the gears 15 and 10 and the speed governor shaft 8.

The gear ratio thus connected up causes the speed of the governor 9 relative to the speed of the driving shaft to correspond with that desired for the intermediate speed range.

When the handle 33 is shifted to the intermediate speed position, the enlarged section 56 of the rod 53 drops into the corresponding opening 57 in the handle 33 and thereby locks the parts in this position so long as there is substantial pressure in the main reservoir.

If, however, the main reservoir pressure should fail, for any reason, the piston 49 will be moved back by the spring 51 and the enlarged section 56 of the rod 53 will be retracted, thus releasing the handle 33 and permitting the parts to be automatically returned to the low speed position by the action of the springs 25, 26, and 27.

If a high speed staff 36 is obtained by the engineer and inserted in the gear box, the flat section 43 thereof will only extend through the bar 45 and in this case, the staff can only be rotated by the handle in a counter clockwise direction.

After depressing the rod 53, the handle 33 can be turned to the right to the high speed position and the arm 19 is turned in the same direction, so that the gears 6 and 14 are disengaged, while the internal gear 16 engages with the gear 10. A direct communication is thereby made from the driving shaft 5 to the governor shaft 8 for operating the governor at the high speed range.

If a neutral staff 35 is provided and inserted in the proper place in the gear box, the handle 33 may be turned to the right, the same as with a high speed staff, but it will be noted that the key 39 of the staff 35 is cut away at the sides, so that there is a certain amount of lost motion between the staff and the arm 19.

The result is that while the handle 33 is turned to the high speed position, the arm 19 will be turned through a lesser angle, for example, if the angular movement to the high speed position be 25°, the lost motion may be such that the arm 19 only turns through an angle of 17°, as indicated in Fig. 3.

This movement of the arm 19 serves to disengage the gears 6 and 14 but is not sufficient to cause the engagement of the internal gear 16 with the gear 10.

As a consequence, the driving shaft 5 is entirely disconnected from the governor shaft 8 and the speed mechanism is thus rendered inoperative.

It will thus be seen that by means of the above described construction, the speed range of the apparatus may be changed to correspond with the particular class of service in which the locomotive is to be used, but the engineer cannot make any change in the speed range unless authorized to do so by the train despatcher allowing him to receive a staff corresponding with the proposed speed range.

Having now described my invention, what I claim as new and desire to secure by Letters Patent, is:—

1. In a train speed control apparatus, the combination with a speed governor and a driving member operating in accordance with the speed of the train, of a change speed mechanism operatively connecting the driving member with the speed governor for varying the speed of the governor relative to the speed of the driving member.

2. In a train speed control apparatus, the combination with a speed governor and a driving member operating at a speed relative to the speed of the train, of a change speed gear mechanism having different positions for varying the speed of the governor relative to the speed of the driving member and means including a removable staff for setting the speed gear mechanism to its different positions.

3. In a train speed control apparatus, the combination with a speed governor and a driving member operating at a speed relative to the speed of the train, of a change speed gear mechanism having different positions for varying the speed of the governor relative to the speed of the driving member, an arm for shifting said mechanism to its different positions, a handle, and a removable staff for operatively connecting the handle with said arm.

4. In a train speed control apparatus, the combination with a speed governor and a driving member operating at a speed relative to the speed of the train, of a change speed gear mechanism having different positions for varying the speed of the governor relative to the speed of the driving member and means including a removable staff for biasing the shifting of the gear mechanism to one of its positions.

5. In a train speed control apparatus, the combination with a speed governor and a driving member operating at a speed relative to the speed of the train, of a change speed gear mechanism having different positions for varying the speed of the governor relative to the speed of the driving member, a handle for shifting said gear mechanism to its different positions, a removable staff for operatively connecting the handle to said gear mechanism, and means for limiting the movement of the staff and thereby the handle to one of the operating positions.

6. In a train speed control apparatus, the combination with a speed governor and a driving member operating at a speed relative to the speed of the train, of a change speed gear mechanism having different positions for varying the speed of the governor relative to the speed of the driving member, a handle for shifting said gear mechanism to its different positions, a removable staff for operatively connecting the handle to said gear mechanism, and means for locking the staff and thereby the handle against movement except to one position corresponding with the staff employed.

7. In a train speed control apparatus, the combination with a speed governor and a driving member operating at a speed relative to the speed of the train, of a change speed gear mechanism having different positions for varying the speed of the governor relative to the speed of the driving member, a rotatable arm for shifting said gear mechanism to its different positions, a handle, a removable staff for operatively connecting the handle to said arm, and means for limiting the rotative movement of the staff, so that the gear mechanism can be shifted to only one of its different positions.

8. In a train speed control apparatus, the combination with a speed governor and a driving member operating at a speed relative to the speed of the train, of a change speed gear mechanism having different positions for varying the speed of the governor relative to the speed of the driving member and means constantly tending to shift said mechanism to one of its positions.

9. In a train speed control apparatus, the combination with a speed governor and a driving member operating at a speed relative to the speed of the train, of a change speed gear mechanism having different positions for varying the speed of the governor, including a low speed position and means tending to yieldingly maintain said mechanism in its low speed position.

10. In a train speed control apparatus, the combination with a speed governor and a driving member operating at a speed relative to the speed of the train, of a change speed gear mechanism having different positions for varying the speed of the governor, including a low speed position and a spring device constantly tending to shift said gear mechanism to and maintain the same in its low speed position.

11. In a train speed control apparatus, the combination with a speed governor and a driving member operating at a speed relative to the speed of the train, of a change speed gear mechanism having different positions for varying the speed of the governor relative to the speed of the driving member and including a low speed position, an arm for shifting said mechanism, means tending to shift said mechanism to its low speed position, and a locking device for locking said arm in the low speed position.

12. In a train speed control apparatus, the combination with a speed governor and a driving member operating at a speed relative to the speed of the train, of a change speed gear mechanism having different positions for varying the speed of the governor relative to the speed of the driving member and including a low speed position, an arm for shifting said mechanism, a handle, a removable staff for operatively connecting said handle to said arm, and a locking device for locking said arm in the low speed position and adapted to be released upon inserting the staff in position.

13. In a train speed control apparatus, the combination with a speed governor and a driving member operating at a speed relative to the speed of the train, of a change speed gear mechanism having different positions for varying the speed of the governor relative to the speed of the driving member and including a low speed position, means tending to shift said gear mechanism to its low speed position, an arm for shifting said mechanism to its different positions, a handle, a removable staff for operatively connecting said handle to said arm, and a locking device for locking said arm in the low speed position and adapted to release said arm upon insertion of the staff in position.

14. In a train speed control apparatus, the combination with a speed governor and a driving member operating at a speed relative to the speed of the train, of a change speed gear mechanism having different positions for varying the speed of the governor relative to the speed of the driving member, means including a handle for shifting said gear mechanism to its different positions, a device for locking said handle against movement, and means operated by fluid under pressure for maintaining said device in its locked position.

15. In a train speed control apparatus, the combination with a speed governor and a driving member operating at a speed relative to the speed of the train, of a change speed gear mechanism having different positions for varying the speed of the governor relative to the speed of the driving member, means including a handle for shifting said gear mechanism to its different positions, a detent for locking said handle in its different positions, and means operated by fluid under pressure for holding said detent in its locked position and adapted upon release of fluid pressure to release said detent.

16. In a train speed control apparatus, the combination with a speed governor and a driving member operating at a speed relative to the speed of the train, of a change speed gear mechanism having different positions for varying the speed of the governor relative to the speed of the driving member, means including a handle for shifting said gear mechanism to its different positions, a yielding detent for locking said handle in its different positions and adapted to be manually released, and means operated by fluid under pressure for holding said detent in its locked position and adapted upon release of fluid pressure to release said detent.

17. In a train speed control apparatus, the combination with a speed governor and a driving member operating at a speed relative to the speed of the train, of a change speed gear mechanism interposed between the driving member and the speed governor and having different positions for varying the speed of the governor relative to the speed of the driving member, means tending to shift said gear mechanism to one speed position, a handle for shifting said mechanism, and means operated by fluid under pressure for locking said handle in its different operating positions and adapted upon release of fluid under pressure to release said handle and thereby permit movement of the handle and the gear mechanism to said speed position.

18. In a train speed control apparatus, the combination with a speed governor and a driving member operating at a speed relative to the speed of the train, of a change speed gear mechanism interposed between the driving member and the speed governor and having different positions for varying the speed of the governor relative to the speed of the driving member, a handle, a removable staff for operatively connecting said handle to said gear mechanism, and means tending to shift said gear mechanism to a low speed position and operative upon removal of the staff.

19. In a train speed control apparatus, the combination with a speed governor and a driving member operating according to the speed of the train, of a change speed gear mechanism interposed between the driving member and the governor and having a low speed position, a high speed position, an intermediate speed position, and an inoperative position, an arm for operating said gear mechanism, a handle, and removable staffs for operatively connecting said handle to said arm, one adapted to permit movement of the handle only to the high speed position, another only to the intermediate speed position, and another only to the inoperative position.

20. In a train speed control apparatus, the combination with a speed governor and a driving member operating according to the speed of the train, of a change speed gear mechanism interposed between the driving member and the governor and having a low speed position, a high speed position, an intermediate speed position, and an inoperative position, an arm for operating said gear mechanism, a handle, removable staffs for operatively connecting said handle to said arm, one adapted to permit movement of the handle only to the high speed position, another only to the intermediate speed position, and another only to the inoperative position, and means tending to shift said gear mechanism to the low speed position in the absence of a staff.

21. In a train speed control apparatus, the combination with a speed governor and a change speed gear mechanism having a plurality of positions for varying the speed of the governor relative to the speed of the train, of a handle for shifting said gear mechanism to its different positions, a plurality of removable staffs for operatively connecting said handle to said gear mechanism, and means for defining the movement of each staff, so that the handle can only be shifted to a particular position, corresponding with the staff employed.

22. In a train speed control apparatus, the combination with a speed governor and a driving member therefor, of means for operatively connecting the driving member to the governor for operating the governor at different speeds relative to the speed of the driving member, a handle for shifting said means to its different speed positions, and a removable staff for operatively connecting said handle to said means.

23. In a train speed control apparatus, the combination with a speed governor and a driving member therefor, of means for operatively connecting the driving member to the governor for operating the governor at different speeds relative to the speed of the driving member, a handle for shifting said means to its different speed positions, and a removable staff for operatively connecting said handle to said means and for determining the speed position to which the handle may be moved.

In testimony whereof I have hereunto set my hand.

CLYDE C. FARMER.